United States Patent Office 2,806,063
Patented Sept. 10, 1957

2,806,063
AMINE SALTS OF CHLOROPHENOLS

Raymond H. Rigterink, Midland, Mich., assignor to The Dow Chemical Company, Midland, Mich., a corporation of Delaware No Drawing. Application April 23, 1956,
Serial No. 579,775

6 Claims. (Cl. 260—567.5)

This invention is concerned with amine salts of chlorophenols having the structure

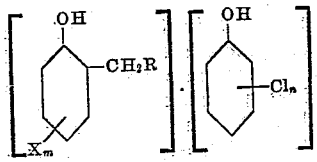

In this and succeeding formulae, R represents a member of the group consisting of alkylamino, dimethylamino, diethylamino, cyclohexylamino, piperidino and morpholino, X is a member of the group consisting of chlorine and lower alkyl, $m$ is an integer from 1 to 3, inclusive, and $n$ is an integer from 2 to 3, inclusive. These compounds are usually solids or viscous oils. They are soluble in polar organic solvents such as propanol, ethanol, acetone and of some solubility in water. These compounds are useful as toxicants in microbicidal compositions, such as in bactericidal and fungicidal preparations. They have the advantage of increased water solubility and decreased vapor pressure over certain known antimicrobial compositions.

The new amine salts of chlorophenols may be prepared by combining a chlorophenol having the structure

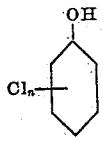

with an α-aminocresol compound having the formula

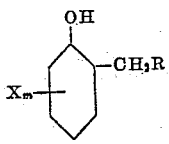

The reaction takes place readily in the temperature range of 20° to 80° C. with the formation of the desired salt. An inert solvent such as ethanol or isopropanol provides a convenient reaction medium. Good results are obtained when substantially equimolar amounts of the chlorophenol and α-aminocresol compound are employed.

In carrying out the reaction, the chlorophenol and α-aminocresol are dissolved in the solvent and the resulting mixture heated for a period of from a few minutes to about one hour. After completion of the reaction, the reaction mixture is heated to distill the water of reaction and solvent and to recover as residue the salt product. The latter may be purified by conventional methods such as recrystallization or distillation under reduced pressure.

A particular group of the new amine salts having the structure

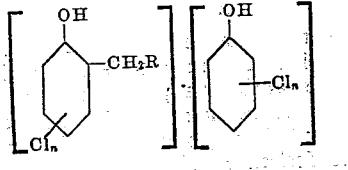

may be prepared by causing a chlorophenol, a suitable amine and formaldehyde to interact. Suitable amines include dimethylamine, diethylamine, piperidine, morpholine, cyclohexylamine and primary aliphatic amines such as methylamine, ethylamine, butylamine, octylamine and dodecylamine. The reaction is usually carried out in an inert polar solvent such as ethanol and takes place readily in the temperature range of from 20° to 80° C. with the formation of the desired compound. Good results are obtained when substantially two molecular proportions of the phenolic compound are employed with one molecular proportion of formaldehyde and one molecular proportion of the amine.

In carrying out the latter reaction, the chlorophenol, the formaldehyde and the amine are dissolved in the reaction solvent. The mixture is heated for a period of from about one-half to two hours at the boiling temperature under reflux. At the end of this period, the mixture is distilled to remove the solvent and water. The amine salt product residue may be purified, if desired, by recrystallization.

The following examples illustrate the invention, but are not to be construed as limiting.

Example 1

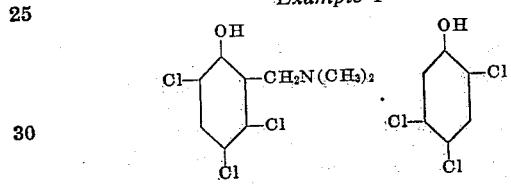

44.6 grams (0.55 mole) of 36–38 percent aqueous formaldehyde was added portionwise to a stirred mixture of 98.8 grams (0.5 mole) of 2,4,5-trichlorophenol and 270 grams (1.5 moles) of 25 percent aqueous dimethylamine while the temperature of the mixture was maintained at 25° to 30° C. The resulting solution was stirred and heated for two hours at reflux temperature and then distilled to remove most of the dimethylamine and water. After completion of the distillation, the mixture was cooled and the residue dissolved in toluene and washed repeatedly with water. The toluene solution was heated first at atmospheric pressure and then at reduced pressure to distill the toluene solvent and to obtain as residue a light brown crystalline α-dimethylamino-3,4,6-trichloro-o-cresol salt of 2,4,5-trichlorophenol. This product, after recrystallization first from petroleum ether (B. P. 60°–70° C.) and then from toluene, melted at 120°–122° C., and had a nitrogen content of 3.17 percent. The theoretical value is 3.11 percent.

Example 2

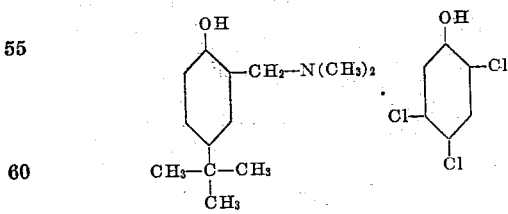

49.4 grams (0.25 mole) of 2,4,5-trichlorophenol and 51.8 grams (0.25 mole) of 4-tertiary-butyl-α-dimethylamino-o-cresol were dissolved in 100 milliliters of 95 percent ethanol and heated at the boiling point under reflux for one hour. The mixture was stirred during the heating. After completion of the heating, the clear reaction solution was fractionally distilled to obtain a yellow viscous oil boiling from 100° to 120° C. at 0.5 millimeters pressure. On standing, the oil changed to a waxy solid 4-tertiary-butyl-α-dimethylamino-o-cresol salt of 2,4,5-trichlorophenol as a product melting from 80° to 93° C.

*Example 3*

81.5 grams (0.5 mole) of 2,4-dichlorophenol, 45 grams (0.25 mole) of 25 percent aqueous dimethylamine and 20.3 grams (0.25 mole) of 36–38 percent aqueous formaldehyde were dissolved in 200 milliliters of 95 percent ethanol. The mixture was stirred while heating at the boiling temperature under reflux for one hour. After completion of the reflux period, the mixture was heated under reduced pressure to distill most of the alcohol and water and to obtain as an oily residue a 4,6-dichloro-α-dimethylamino-o-cresol salt of 2,4-dichlorophenol. This product crystallized on standing to a solid melting from 75.5° to 78° C.

*Example 4*

98.8 grams (0.5 mole) of 2,4,5-trichlorophenol, 21.8 grams (0.25 mole) of morpholine, 20.3 grams (0.25 mole) of 36–38 percent formaldehyde and 200 milliliters of 95 percent ethanol were heated and stirred at the boiling point under reflux for one hour. The pressure on the system was reduced and the heating continued to distill alcohol and water and to obtain as residue a dark red, viscous oil. The oil crystallized on standing to a 3,4,6-trichloro-α-morpholino-o-cresol salt of 2,4,5-trichlorophenol as a product melting from 59° to 62° C.

*Example 5*

In a synthesis carried out in a manner similar to that described in Example 4, 98.8 grams (0.5 mole) of 2,4,5-trichlorophenol, 20.4 grams (0.25 mole) of 36–38 percent aqueous formaldehyde, 18.3 grams (0.25 mole) of diethylamine and 200 milliliters of 95 percent ethanol were caused to interact and to obtain a dark reddish brown oily α-diethylamino-3,4,6-trichloro-o-cresol salt of 2,4,5-trichlorophenol. This product had a nitrogen content of 2.50 percent, the theoretical value being 2.92 percent.

*Example 6*

19.8 grams (0.1 mole) of 2,4,5-trichlorophenol and 23.0 grams (0.1 mole) of 4,6-dichloro-α-dimethylamino-o-cresol were added to 100 milliliters of 95 percent ethanol and dissolved therein by warming on a steam bath. The clear solution so formed was cooled in ice-water whereupon crystals of unreacted 4,6-dichloro-α-dimethylamino-o-cresol precipitated. These crystals were removed by filtration. The filtrate was diluted with water whereupon an oil precipitated. The heterogeneous liquid mixture was heated at reduced pressure to distill the alcohol and water and to recover as residue a dark brown oily 4,6-dichloro-α-dimethylamino-o-cresol salt of 2,4,5-trichlorophenol. This crude product was purified by repeated treatment comprising dissolving the oil in warm petroleum ether (B. P. 86°–100° C.), cooling the resulting solution to reprecipitate the oily product and decanting the solvent layer. The resulting residue was a brown viscous liquid having a nitrogen content of 3.12 percent. The theoretical value is 3.35 percent. Infrared analysis indicated the product to be a salt of 2,4,5-trichlorophenol.

*Example 7*

112 grams (0.363 mole) of α-cyclohexylamino-3,4,6-trichloro-o-cresol was dissolved in 300 milliliters of ethanol by warming on the steam bath and 71.6 grams (0.363 mole) of 2,4,5-trichlorophenol was added thereto. The resulting solution was distilled to remove alcohol solvent and to obtain as residue a 3,4,6-trichloro-α-cyclohexylamino-o-cresol salt of 2,4,5-trichlorophenol. This product was purified by repeated washing with petroleum ether (B. P. 86°–100° C.) to obtain a white crystalline product melting at 143°–144.5° C. The latter had a chlorine content of 41.62 percent and a nitrogen content of 2.80 percent. The theoretical values are 42.1 percent and 2.77 percent, respectively.

*Example 8*

49.4 grams (0.25 mole) of 2,4,5-trichlorophenol and 47.82 grams (0.25 mole) of 4-methyl-α-piperidino-o-cresol are dissolved in 100 milliliters of 95 percent ethanol and heated at the boiling point under reflux for one hour. The mixture is stirred during the heating. At the end of this period, the pressure on the system is reduced and the water and solvent distilled to obtain as residue a 4-methyl-α-piperidino-o-cresol salt of 2,4,5-trichlorophenol having a molecular weight of 197.6.

*Example 9*

81.5 grams (0.5 mole) of 2,4-dichlorophenol and 116.57 grams (0.5 mole) of 4,5-dimethyl-α-cyclohexylamino-o-cresol are dissolved in 200 milliliters of 95 percent ethanol and heated at the boiling point under reflux for one hour. The mixture is stirred during the heating. At the end of this period, the pressure on the system is reduced and the water and solvent distilled to obtain as residue a 4,5-dimethyl-α-cyclohexylamino-o-cresol salt of 2,4-dichlorophenol. The latter is washed repeatedly with petroleum ether to obtain a purified product having a molecular weight of 279.5.

*Example 10*

197.5 grams (1.0 mole) of 2,4,5-trichlorophenol, 75 grams (0.5 mole) of 30 percent aqueous ethylamine, and 40.7 grams (0.5 mole) of 37–38 percent aqueous formaldehyde in 100 milliliters of ethanol were mixed and heated under reflux with stirring for two hours. The mixture was then cooled whereupon it became a semi-solid mass. The latter was filtered to obtain a crystalline 3,4,6 - trichloro - α - ethylamino - o - cresol salt of 2,4,5-trichlorophenol. This product was washed with cold ethanol, dried at room temperature, and recrystallized from toluene. The recrystallized product melted at 125°–127° C. and had a chlorine content of 47.87 percent. The theoretical value is 47.2 percent.

*Example 11*

197.5 grams (1.0 mole) of 2,4,5-trichlorophenol, 92.7 grams (0.5 mole) of dodecylamine and 40.7 grams (0.5 mole) of 37–38 percent formaldehyde were mixed and heated under reflux while stirring for two hours. The mixture was then heated under reduced pressure to distill alcohol and water and to obtain as residue a 3,4,6-trichloro-α-dodecylamino-o-cresol salt of 2,4,5-trichlorophenol. This product was recrystallized from petroleum ether (B. P. 86°–100° C.). The product after washing with ice cold petroleum ether and drying at room temperature melted at 85°–87° C.

In preparations carried out in a manner similar to that described in Example 11, other amine salts may be prepared from the respective aminocresols and chlorophenols, as, for example, 3,4,6-trichloro-α-methylamino-o-cresol salt of 3,4,6-trichlorophenol; 3,4,6-trichloro-α-octylamino-o-cresol salt of 3,4,6-trichlorophenol and 4,6-dichloro-α - secondary - butylamino - o - cresol with 2,4-dichlorophenol.

The α-aminocresol compound having the structure

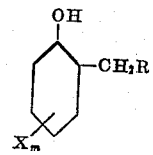

may be prepared by mixing equimolar proportions of the appropriate phenol, formaldehyde and amine in a solvent such as ethanol, usually with cooling. The mixture is stirred and heated under reflux from one-half to several hours, and then allowed to cool to room temperature. The desired α-amino-cresol may precipitate on cooling whereupon it can be isolated by filtration. If no precipitation of the α-amino-cresol occurs, the mixture may be heated to distill the solvents and obtain the desired product as residue. The latter may be employed in the preparation of the salt without purification.

The products of the present invention may be employed as toxicants in parasiticidal compositions. In a representative operation, a 3,4,6-trichloro-α-morpholino-o-cresol salt of 2,4,5-trichlorophenol was added to a medium inoculated with Salmonella typhosa and incubated at 30° C. for four days. Examination at the end of this period showed complete inhibition of growth of the test organisms when the concentration of the salt in the medium was 0.005 percent.

I claim:

1. An amine salt of a chlorophenol having the formula

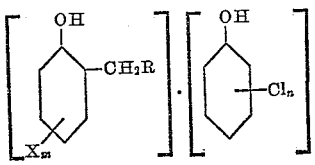

wherein R is a member of a group consisting of alkylamino, dimethylamino, diethylamino, cyclohexylamino, piperidino and morpholino, X is a member of the group consisting of chlorine and lower alkyl, $m$ is an integer from 1 to 3, inclusive, and $n$ is an integer from 2 to 3, inclusive.

2. α - Dimethylamino - 3,4,6 - trichloro-o-cresol salt of 2,4,5-trichlorophenol.

3. 4 - tertiary - butyl - α - dimethylamino - o - cresol salt of 2,4,5-trichlorophenol.

4. 3,4,6 - trichloro - α - cyclohexylamino - o - cresol salt of 2,4,5-trichlorophenol.

5. 3,4,6 - trichloro - α - ethylamino - o - cresol salt of 2,4,5-trichlorophenol.

6. 3,4,6 - trichloro - α - dodecylamino - o - cresol salt of 2,4,5-trichlorophenol.

No references cited.